United States Patent
Yamaguchi et al.

(10) Patent No.: US 6,610,236 B1
(45) Date of Patent: Aug. 26, 2003

(54) RESIN MOLDED ARTICLE AND METHOD FOR PRODUCING THE SAME

(75) Inventors: Fumihiko Yamaguchi, Settsu (JP); Yoshitaka Honda, Settsu (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 09/719,137

(22) PCT Filed: Jun. 7, 1999

(86) PCT No.: PCT/JP99/03022
§ 371 (c)(1),
(2), (4) Date: Dec. 8, 2000

(87) PCT Pub. No.: WO99/64518
PCT Pub. Date: Dec. 16, 1999

(30) Foreign Application Priority Data

Jun. 8, 1998 (JP) .......................................... 10-158987

(51) Int. Cl.$^7$ ............................. B29C 71/02; C08J 5/00; C08L 101/00
(52) U.S. Cl. ...................... 264/234; 525/55; 525/199; 525/200; 525/227; 525/276; 525/408; 525/245
(58) Field of Search ........................... 264/234; 525/55, 525/199, 200, 227, 276, 408; 526/245

(56) References Cited

U.S. PATENT DOCUMENTS 6,225,405 B1    5/2001    Yamaguchi et al. .......... 525/55

FOREIGN PATENT DOCUMENTS

| JP | 58-149936 A | * | 9/1983 |
|----|-------------|---|--------|
| JP | 62-196192 A |   | 8/1987 |
| JP | 3-41162 A | * | 2/1991 |
| JP | 5-59203 A |   | 3/1993 |
| JP | 7-149923 A | * | 6/1995 |
| JP | 7268184 A | * | 10/1995 |
| JP | 10-195302 A | * | 7/1998 |
| JP | 11-5967 A | * | 1/1999 |
| WO | WO98/15598 A1 |   | 4/1998 |

OTHER PUBLICATIONS

XP–002177332 English language abstract of JP4068006A(Mar. 3, 1992).

XP–002177333 English language abstract of JP1131270A(May 24, 1989).

XP–002177334 English language abstract of JP7011104A(Jan. 13, 1995).

* cited by examiner

Primary Examiner—Leo B. Tentoni
(74) Attorney, Agent, or Firm—Birch, Stewart, Kolasch & Birch, LLP

(57) ABSTRACT

A resin molded article having a contact angle of water of 50 degrees or less on its surface is produced by molding a thermoplastic or thermosetting resin composition containing a polymer having a perfluoroalkyl group of a (meth)acrylate having a perfluoroalkyl group and a (meth)acrylate having a hydrophilic group, or a compound having a perfluoroalkyl group which is obtained by reacting an epoxy compound having a perfluoroalkyl group with a polyalkylene oxide having a terminal hydroxyl group, and heating the molded article. The molded article has a hydrophilic surface and improved stain-proofing properties.

2 Claims, No Drawings

RESIN MOLDED ARTICLE AND METHOD FOR PRODUCING THE SAME

This application is the national phase under 35 U.S.C. §371 of PCT International Application No. PCT/JP99/03022 which has an International filing date of Jun. 7, 1999, which designated the United States of America.

FIELD OF THE INVENTION

The present invention relates to a resin molded article and a method for producing the same. In particular, the present invention relates to a molded article of a thermoplastic or thermosetting resin having good surface hydrophilicity, which is produced by compounding a polymer or a compound having a perfluoroalkyl group in the thermoplastic or thermosetting resin, and molding the resin, and a method for producing such a molded article. The molded article of the present invention has particularly good stain-proofing properties, and thus can be used as a molded product which is severely stained such as kitchenware, bathroom ware, etc.

BACKGROUND ART

In these years, the analysis of stains have been advanced from the viewpoint of the maintenance of the beauty and cleanliness of articles. Meanwhile, the function of "stain-proofing" has been sought in connection with buildings, structures, and further daily necessaries. In particular, surface treatment, which can impart a function for preventing the deposition of stains or a function for easily removing once deposited stains by washing to materials, has been sought.

To improve the stain-proofing properties, it is known that it is effective to make the surface of a material hydrophilic (or to reduce the contact angle of water). For example, "KOBUNSHI" POLYMERS), Vol. 44, page 307, May 1995 describes that the hydrophilic coating films have good stain-proofing properties in the field of exterior coating.

To make the surfaces hydrophilic, in general, it is contemplated to "apply a compound which imparts hydrophilicity" to the surfaces. Apart from this, it is contemplated to "blend (internally add) a hydrophilic compound", when substrates are formed of resins.

For example, in relation to the method to "apply a compound which imparts hydrophilicity", the invention of JP-A-62-196192 makes the surfaces hydrophilic with the application of a water-soluble composition containing an ethylene diamine derivative having a polyalkylene glycol group, polyvinyl alcohol a water-soluble melamine resin, etc.

Furthermore, the method of JP-A-5-59203 makes a surface hydrophilic by applying a colloidal silica in an organic solvent as a dispersion medium and a surfactant to the surface and drying it.

However, the method to "apply a compound which imparts hydrophilicity" has some drawbacks that it requires a further processing step of the once molded article and that the applied compound is easily removed by abrasion and so on and thus the hydrophilic effect disappears. Therefore, when the substrate is made of the resin, it is desirable that the hydrophilic effect can be imparted to the substrate by "blending a hydrophilic compound" from the viewpoint of the process steps and the practical application.

As an organic compound which is compounded in the resin to impart the hydrophilicity, a compound having a polyoxyethylene group or polyvinyl alcohol is well known.

When the commercially distributed polyoxyethylene compound is applied to the surface or kneaded in the resin, the surface may not have hydrophilic properties, or the hydrophilicity may be initially imparted to the surface but its durability is not good.

DISCLOSURE OF THE INVENTION

One object of the present invention is to provide an additive which can impart durable hydrophilicity to the surface of a resin by the internal addition of the additive, and a resin molded article having a hydrophilic surface.

As a result of the extensive study, it has been found that a molded article of a thermoplastic or thermosetting resin having good hydrophilicity can be obtained by compounding a polymer having a perfluoroalkyl group comprising repeating units derived from a (meth)acrylate having a perfluoroalkyl group and repeating units derived from a (meth)acrylate having a hydrophilic group, or a compound having a perfluoroalkyl group obtained by reacting an epoxy compound having a perfluoroalkyl group with a polyalkylene oxide having a terminal hydroxyl group in the resin, and molding the resin, and thus the present invention has been completed.

Accordingly, the present invention provides (1) a resin molded article of a resin composition comprising 100 wt. parts of a resin and 0.1 to 5 wt. parts of a polymer having a perfluoroalkyl group which comprises repeating units derived from a (meth)acrylate having a $C_5$–$C_{18}$ perfluoroalkyl group and repeating units derived from a (meth)acrylate having a hydrophilic group in a weight ratio of 1:1 to 1:10, wherein a contact angle of water is 50 degrees or less on the surface of said molded article;

(2) a method for producing a resin molded article having a contact angle of water of 50 degrees or less on its surface comprising the steps of:
molding a resin composition comprising 100 wt. parts of a resin and 0.1 to 5 wt. parts of a polymer having a perfluoroalkyl group which comprises repeating units derived from a (meth)acrylate having a $C_5$–$C_{18}$ perfluoroalkyl group and repeating units derived from a (meth)acrylate having a hydrophilic group in a weight ratio of 1:1 to 1:10, and
heating the molded article at a temperature in the range between 70° C. and 130° C.;

(3) a resin molded article of a resin composition comprising 100 wt. parts of a resin and 0.1 to 5 wt. parts of a compound having a perfluoroalkyl group which is obtained by reacting an epoxy compound having a $C_5$–$C_{18}$ perfluoroalkyl group with a polyalkylene oxide having a terminal hydroxyl group, wherein a contact angle of water is 50 degrees or less on the surface of said molded article; and (4) a method for producing a resin molded article having a contact angle of water of 50 degrees or less on its surface comprising the steps of:
molding a resin composition comprising 100 wt. parts of a resin and 0.1 to 5 wt. parts of a compound having a perfluoroalkyl group which is obtained by reacting an epoxy compound having a $C_5$–$C_{18}$ perfluoroalkyl group with a polyalkylene oxide having a terminal hydroxyl group, and
heating the molded article at a temperature in the range between 70° C. and 130° C.

DETAILED DESCRIPTION OF THE INVENTION

The (meth) acrylate having a $C_5$–$C_{18}$ perfluoroalkyl group used in the present invention is not limited and any known one may be used. The perfluoroalkyl group and the (meth) acrylate group may be directly bonded each other, or bonded through a suitable linking group. Herein, the term "(meth) acrylate" is intended to mean an acrylate ester or a methacrylate ester.

A preferable example of the (meth)acrylate having a $C_5$–$C_{18}$ perfluoroalkyl group used in the present invention is a (meth)acrylate of the formula:

$$CH_2=CR^1-COO-(CH_2)_a-R^2-Rf \qquad (1)$$

wherein $R^1$ is a hydrogen atom or a methyl group, $R^2$ is a single bound or a group of the formula: $-SO_2NR^3-$ in which $R^3$ is a hydrogen atom or a $C_1$–$C_3$ alkyl group, Rf is a linear or branched $C_5$–$C_{18}$ perfluoroalkyl group, and a is an integer of 0 to 3.

Specific examples of the compound of the formula (1) include (meth)acrylates having a linear or branched perfluoroalkyl group such as $CH_2=CHCOOC_2H_4C_6F_{13}$, $CH_2=C(CH_3)COOC_2H_4C_6F_{13}$, $CH_2=CHCOOC_2H_4C_8F_{17}$, $CH_2=C(CH_3)COOC_2H_4C_8F_{17}$, $CH_2=CHCOOC_2H_4C_{16}F_{33}$, $CH_2=C(CH_3)COOC_2H_4C_{16}F_{33}$, $CH_2=CHCOOC_3H_6(CF_2)_6CF(CF_3)_2$, $CH_2=C(CH_3)COOC_3H_6(CF_2)_6CF(CF_3)_2$, $CH_2=CHCOOC_3H_6(CF_2)_{10}CF(CF_3)_2$, $CH_2=C(CH_3)COOC_3H_6(CF_2)_6CF(CF_3)_2$, $CH_2=CHCOOC_2H_4N(C_2H_5)SO_2(CF_2)_6CF_3$, $CH_2=C(CH_3)COOC_2H_4N(C_2H_5)SO_2(CF_2)_6CF_3$, etc. Among them, the (meth)acrylates having 8 to 12 carbon atoms are preferable. These compounds may be used independently or in admixture of two or more of them.

A preferable example of the (meth)acrylate having a hydrophilic group is a (meth)acrylate of the formula:

$$CH_2=CR^1-COOR^4 \qquad (2)$$

wherein $R^1$ is the same as defined above, and $R^4$ is a polyoxyalkylene group having 2 to 150 carbon atoms or a $C_1$–$C_{18}$ alkyl group having a hydroxyl group.

Specific examples of the compound of the formula (2) include $CH_2=CHCOO(CH_2CH_2O)_8H$, $CH_2=C(CH_3)COO(CH_2CH_2O)_{10}H$, $CH_2=CHCOO[C(CH_3)HCH_2O]_{10}H$, $CH_2=C(CH_3)COOCH_2CH_2OH$, $CH_2=CHCOOCH_2CH(OH)CH_2OH$, $CH_2=C(CH_3)COOCH_2CH(OH)CH_2Cl$, $CH_2=CHCOOCH_2CH_2OH$, etc. They may be used independently or in admixture of two or more of them.

The weight ratio of the (meth)acrylate having a $C_5$–$C_{18}$ perfluoroalkyl group (the first monomer) to the (meth) acrylate having a hydrophilic group (the second monomer) to be copolymerized is preferably in the range between 1:1 and 1:10.

The first monomer functions to bleed the copolymer to the surface after the obtained copolymer is compounded in the resin and then molded, while the second monomer functions to impart the hydrophilic properties to the surface after bleeding of the copolymer. When the amount of the first monomer is too high, the hydrophilicity is not imparted to the resin surface and the surface becomes rather water-repellent. When the amount of the first monomer is too low, the sufficient amount of the copolymer is not bled to the surface so that the effect to impart the hydrophilicity to the surface is insufficient.

Apart from these two monomers, at least one other monomer copolymerizable with these monomers may be copolymerized in an amount such that the hydrophilicity is not impaired.

Examples of such other monomer include vinyl acetate, vinyl chloride, styrene, α-methylstyrene, $C_1$–$C_{25}$ alkyl esters of (meth)acrylic acid, $C_6$–$C_{30}$ aryl esters of (meth) acrylic acid, (meth)acryl amides, etc.

The resin composition containing the copolymer has better hydrophilicity as the amount of the other monomer decreases. Accordingly, the other monomer is preferably used in an amount of 0 to 50 wt. % of the total weight of the above two essential monomers. More preferably, the other monomer is not used.

However, the anchor effect of the copolymer on the resin can be improved by the use of the other monomer depending on the resin to be used, and the durability of the hydrophilicity can be improved.

The polymer having a perfluoroalkyl group used in the present invention may be prepared by any conventional polymerization method such as bulk polymerization, solution polymerization, suspension polymerization, emulsion polymerization, etc. Apart from the thermal polymerization, photopolymerization, radiation polymerization and so on may be employed. As a polymerization initiator, a conventionally used initiator such as an azo compound, a peroxide, a persulfate, etc. can be used.

The molecular weight of the polymer having a perfluoroalkyl group is preferably from 1,000 to 60,000, in particular, from 2,000 to 10,000. When the molecular weight of the polymer is small, the initial bleeding of the copolymer to the surface is enhanced, but the durability of the hydrophilicity deteriorates. When the molecular weight is large, the bleeding-out properties deteriorate so that the function of the polymer to make the surface hydrophilic decreases.

The molecular weight of the polymer may be easily adjusted using a conventional chain transfer agent (e.g. mercaptan, α-methylstyrene, carbon tetrachloride, etc.)

The epoxy compound having a $C_5$–$C_{18}$ perfluoroalkyl group to be used in the present invention is preferably an epoxy compound of the formula:

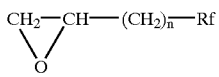

wherein n is 0, 1 or 2, and Rf is a $C_5$–$C_{18}$ perfluoroalkyl group.

Specific examples of the above epoxy compound include

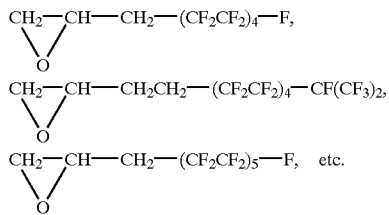

The polyalkylene oxide having a terminal hydroxyl group, which is reacted with the epoxy compound having a perfluoroalkyl group is preferably a compound of the formula:

$$X-(CH_2CH_2O)_x-[CH(CH_3)CH_2O]_y-Z$$

wherein x and y are each 0 or a positive integer, for example, 1 to 30 provided that x and y are not zero at the same time, X is a $C_1$–$C_{10}$ alkyl group, a $C_1$–$C_{10}$ alkoxyl group, a hydroxyl group or a hydrogen atom, and Z is a $C_1$–$C_{10}$ alkyl group or a hydrogen group provided that Z is a hydrogen atom when X is not a hydroxyl group.

Specific examples of the above compound include

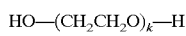

wherein k is 45 on the average, which has a number average molecular weight of about 2,000;

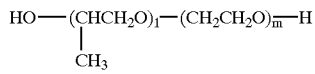

wherein l:m is 1:1, which has a number average molecular weight of about 5,000;

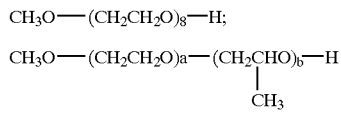

wherein a:b is 8:2, which has a number average molecular weight of about 8,000.

The polyalkylene oxide having a terminal hydroxyl group may have a hydroxyl group at one end or hydroxyl groups at both ends. In the former case, one mole of the epoxy compound having a perfluoroalkyl group reacts with one mole of the polyalkylene oxide, while in the latter case, 2 moles of the epoxy compound having a perfluoroalkyl group reacts with one mole of the polyalkylene oxide.

Like the above copolymer, when the molecular weight of the reaction product of the polyalkylene oxide and the epoxy compound having a perfluoroalkyl group is small, the initial bleeding of the reaction product to the surface is enhanced, but the durability of the hydrophilicity deteriorates. When the molecular weight of the compound is large, the bleeding-out properties deteriorate so that the function of the reaction product to make the surface hydrophilic decreases. Accordingly, the number average molecular weight of the polyalkylene oxide used as a raw material is preferably from 1,000 to 60,000, particularly preferably from 1,000 to 10,000. The molecular weight of the reaction product can be easily adjusted by the selection of the raw materials, that is, the epoxy compound and the polyalkylene oxide having a terminal hydroxyl group.

The reaction of the epoxy compound and the polyalkylene oxide having a terminal hydroxyl group is usually carried out in a solvent in the presence of a catalyst.

The copolymer or compound having a perfluoroalkyl group, which is prepared as described above, is added in an amount of 0.1 to 5 wt. parts to 100 wt. parts of the thermoplastic or thermosetting resin. When this amount is less than 0.1 wt. parts, the effect to make the surface hydrophilic is not sufficiently achieved. When it exceeds 5 wt. parts, the production cost of the molded article is disadvantageous. A more preferable amount is from 0.5 to 3 wt. parts per 100 wt. parts of the resin.

The thermoplastic resin to be contained in the resin composition of the present invention may be any conventional thermoplastic resin. Examples of the thermoplastic resin include polyethylene, polypropylene, polyvinyl chloride, polystyrene, acrylic resins, polyesters, polycarbonate, polyamide, etc.

To blend the copolymer or compound having a perfluoroalkyl group and the thermoplastic resin, any of a single-screw extruder, a twin-screw extruder, an open roll, a kneader, a mixer, etc. may be used.

The thermoplastic resin composition of the present invention can be molded by any known method such as extrusion, injection molding, compression molding, filming, etc. to provide the molded article with hydrophilicity.

The thermosetting resin to be contained in the resin composition of the present invention may be any conventional thermosetting resin. Examples of the thermosetting resin include epoxy resins, phenol resin, urea resins, melamine resins, alkyd resin, unsaturated polyester resins, diallyl phthalate resins, polyurethane, silicone resins, etc.

The copolymer or compound having a perfluoroalkyl group and the thermosetting resin are directly mixed and blended prior to the molding of the thermosetting resin, that is, the addition of a curing agent.

The thermosetting resin composition of the present invention can be molded by any known method such as injection molding (heating to cure), compression molding, transfer molding, etc. to provide the molded article with surface hydrophilicity.

In the present invention, the molded article is further heated after molding to make the surface of the thermoplastic or thermosetting resin hydrophilic sufficiently.

For example, the heat treatment is carried out by heating the molded article in an oven at a specific temperature. The heating temperature is usually from 70 to 130° C., preferably from 80 to 120° C.

In addition to the copolymer or compound having a perfluoroalkyl group, the resin composition of the present invention may contain known additives such as fillers, pigments, antistatic agents, antibiotics, etc. in amounts such that the hydrophilicity is not deteriorated.

Specific examples of the molded article are as follows:

Bathroom wares (e.g. bathtubs, interior parts of set-in bath, washbasin, tubs, soap dishes, shampoo racks, chairs, etc.);

Kitchen wares (e.g. baking sheets, kitchen sinks, washing tubs, tidies, drain baskets, detergent racks, etc.);

Toilet wares (e.g. toilet seats, paper holders, toilet corner tidies, reservoirs, towel rails, toilet brushes, cases of toilet brushes, etc.);

Hygienic and care goods (e.g. portable toilets, bedpans, hand rails, etc.);

Wash goods (e.g. toothpaste tube racks, tooth mugs, trays, towel rails, mirror tables, etc.);

Sanitary goods (e.g. buckets, compost bins, tubs, ash bins, etc.);

Storage goods (e.g. dress cases, racks with casters, coat racks, etc.);

Baby goods (e.g. chamber pots, baby toilet seats, stools, containers of feeding bottles, etc.).

EXAMPLES

The present invention will be illustrated by the following Examples, which do not limit the scope of the invention in any way.

Reference Example 1

Preparation of a Copolymer Having a Perfluoroalkyl Group

In a 3 liter flask, the following perfluoroacrylate (1) (60 g), the following polyoxyethylene acrylate (2) (540 g), laurylmercaptan (50 g) and isopropanol (IPA) (1 liter) were charged and heated at 70° C. Then, the interior atmosphere of the flask was replaced with nitrogen gas for 30 minutes. To the mixture, azobisisobutyronitrile (AIBN) (10 g) was added and the reaction was carried out while refluxing IPA for 10 hours. When the polymerization rate exceeded 98% according to the analysis with gas chromatography, IPA was distilled off under reduced pressure. The obtained polymer was in the form of starch syrup at room temperature.

(1) $CH_2=CH-COOCH_2CH_2-(CF_2CF_2)_p-CF_2CF_3$ (p=3 on the average);

(2) $CH_2=CH-CO-(OCH_2CH_2)_q-OCH_3$ (q=8 on the average).

Reference Example 2

Preparation of a Copolymer Having a Perfluoroalkyl Group

In a 3 liter flask, the perfluoroacrylate (1) (100 g), the polyoxyethylene acrylate (600 g), stearyl methacrylate (300 g), laurylmercaptan (100 g), IPA (1 liter) were charged and heated at 70° C. Then, the interior atmosphere of the flask was replaced with nitrogen gas for 30 minutes. To the mixture, AIBN (10 g) was added and the reaction was carried out while refluxing IPA for 10 hours. When the polymerization rate exceeded 98% according to the analysis with gas chromatography, IPA was distilled off under reduced pressure. The obtained polymer was in the form of starch syrup at room temperature.

Reference Example 3

Preparation of a Compound Having a Perfluoroalkyl Group

The following polyethylene glycol having terminal hydroxyl groups (3) (number average molecular weight: 2,000) (404 g), chloroform (1.3 liters) and $BF_3$ ether (10 ml) were charged in a 2 liter glass reactor and heated up to 70° C. on an oil bath to reflux chloroform. To the mixture, the following epoxy compound having a perfluoroalkyl group (4) (244 g) was dropwise added, and reacted for 5 hours while heating and stirring. After the disappearance of the peaks assigned to the epoxy compound (4) was confirmed with gas chromatography, the reaction was terminated. After the termination of the reaction, chloroform was recovered with a rotary evaporator. The obtained compound was solid at room temperature.

(3) $HOCH_2-(OCH_2CH_2)_r-OCH_2OH$ (number average molecular weight: 2,000);

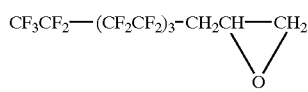

(4)

Reference Example 4

Preparation of a Compound Having a Perfluoroalkyl Group

The polyethylene glycol (3) (404 g), chloroform (1.3 liters) and $BF_3$ ether (10 ml) were charged in a 2 liter glass reactor and heated up to 70° C. on an oil bath to reflux chloroform. To the mixture, the following epoxy compound having a perfluoroalkyl group (5) (212 g) was dropwise added, and reacted for 5 hours while heating and stirring. After the disappearance of the peaks assigned to the epoxy compound (5) was confirmed with gas chromatography, the reaction was terminated. After the termination of the reaction, chloroform was recovered with a rotary evaporator. The obtained compound was solid at room temperature.

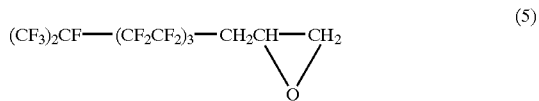

(5)

Reference Example 5

In a 2 liter flask, the perfluoroacrylate (1) (200 g), the polyoxyethylene acrylate (2) (100 g), laurylmercaptan (25 g) and IPA (500 ml) were charged and heated at 70° C. Then, the interior atmosphere of the flask was replaced with nitrogen gas for 30 minutes. To the mixture, AIBN (5 g) was added and the reaction was carried out while refluxing IPA for 10 hours. When the polymerization rate exceeded 98% according to the analysis with gas chromatography, IPA was distilled off under reduced pressure. The obtained polymer was solid at room temperature.

Example 1

The copolymer having a perfluoroalkyl group prepared in Reference Example 1 (1 wt. part) was added to polypropylene (K1016 manufactured by NIPPON TISSO) (100 wt. parts), and melt blended at 180° C. with a twin-screw extruder. Then, the resin composition was press molded to obtain a sheet-form molded article (20 cm×20 cm×2 mm), and the molded article was heated at 100° C. for 1 hour.

Example 2

A molded article was produced in the same manner as in Example 1 except that the amount of the copolymer having a perfluoroalkyl group prepared in Reference Example 1 was changed to 2 wt. parts.

Example 3

A molded article was produced in the same manner as in Example 1 except that the amount of the copolymer having a perfluoroalkyl group prepared in Reference Example 1 was changed to 0.5 wt. part.

Example 4

A molded article was produced in the same manner as in Example 1 except that 1 wt. part of the copolymer having a perfluoroalkyl group prepared in Reference Example 2 was used in place of the copolymer having a perfluoroalkyl group prepared in Reference Example 1.

Example 5

A molded article was produced in the same manner as in Example 1 except that 1 wt. part of the compound having a perfluoroalkyl group prepared in Reference Example 3 was used in place of the copolymer having a perfluoroalkyl group prepared in Reference Example 1.

Example 6

A molded article was produced in the same manner as in Example 1 except that 1 wt. part of the compound having a perfluoroalkyl group prepared in Reference Example 4 was used in place of the copolymer having a perfluoroalkyl group prepared in Reference Example 1.

Example 7

A molded article was produced in the same manner as in Example 1 except that 1 wt. part of the copolymer having a perfluoroalkyl group prepared in Reference Example 1 was added to 100 wt. parts of polyethylene (M-6454 manufactured by ASAHIKASEI SUNTEC).

Example 8

A molded article was produced in the same manner as in Example 7 except that 1 wt. part of the copolymer having a perfluoroalkyl group prepared in Reference Example 2 was used in place of the copolymer having a perfluoroalkyl group prepared in Reference Example 1.

Example 9

A molded article was produced in the same manner as in Example 7 except that 1 wt. part of the compound having a perfluoroalkyl group prepared in Reference Example 3 was used in place of the copolymer having a perfluoroalkyl group prepared in Reference Example 1.

Example 10

The copolymer having a perfluoroalkyl group prepared in Reference Example 1 (1 wt. part) was added to a phenol resin (PM 840J manufactured by SUMITOMO BAKELITE) (100 wt. parts) and well kneaded to uniformly disperse the copolymer in the resin. Then, the resin composition was molded in a mold at a mold temperature of 165° C. for a curing time of 3 hours to obtain a round sheet-form test piece having a diameter of 8 cm and a thickness of 2 mm. Then, the test piece was heated at 100° C. for 1 hour.

Example 11

The compound having a perfluoroalkyl group prepared in Reference Example 3 (1 wt. part) was added to an unsaturated polyester resin (AP 301B manufactured by TOSHIBA CHEMICAL) (100 wt. parts) and well kneaded to uniformly disperse the compound in the resin. Then, the resin composition was molded in a mold at a mold temperature of 145° C. for a curing time of 3 hours to obtain a round sheet-form test piece having a diameter of 8 cm and a thickness of 2 mm. Then, the test piece was heated at 100° C. for 1 hour.

Comparative Example 1

A molded article was produced in the same manner as in Example 1 except that no compound having a perfluoroalkyl group was used.

Comparative Example 2

A molded article was produced in the same manner as in Example 10 except that no compound having a perfluoroalkyl group was used.

Comparative Example 3

A molded article was produced in the same manner as in Example 1 except that 1 wt. part of the compound having a perfluoroalkyl group prepared in Reference Example 5 was used in place of the copolymer having a perfluoroalkyl group prepared in Reference Example 1.

A contact angle of water against each of the molded articles obtained in Examples and Comparative Examples was measured by a droplet method with a contact angle meter (Type CA-DT A manufactured by KYOWA INTERFACE SCIENCE KABUSHIKIKAISHA). The results are shown in Table 1.

TABLE 1

| Example No. | Contact angle of water (degrees) |
|---|---|
| 1 | 42 |
| 2 | 35 |
| 3 | 49 |
| 4 | 48 |
| 5 | 31 |
| 6 | 28 |
| 7 | 40 |
| 8 | 38 |
| 9 | 30 |
| 10 | 32 |
| 11 | 28 |
| C. 1 | 102 |
| C. 2 | 76 |
| C. 3 | 100 |

What is claimed is:

1. A resin molded article of a resin composition comprising 100 wt. parts of at least one thermoplastic resin selected from the group consisting of polyethylene, polypropylene, polystyrene, acrylic resins, polyester, polycarbonate and polyamide, or a thermosetting resin and 0.1 to 5 wt. parts of a compound having a perfluoroalkyl group which is obtained by reacting an epoxy compound having a $C_5$–$C_{18}$ perfluoroalkyl group with a polyalkylene oxide having a terminal hydroxyl group, wherein a contact angle of water is 50 degrees or less on the surface of said molded article.

2. A method for producing a resin molded article having a contact angle of water of 50 degrees or less on its surface comprising the steps of:

molding a resin composition comprising 100 wt. parts of at least one thermoplastic resin selected from the group consisting of polyethylene, polypropylene, polystyrene, acrylic resins, polyester, polycarbonate and polyamide, or a thermosetting resin and 0.1 to 5 wt. parts of a compound having a perfluoroalkyl group which is obtained by reacting an epoxy compound having a $C_5$–$C_{18}$ perfluoroalkyl group with a polyalkylene oxide having a terminal hydroxyl group, and heating the molded article at a temperature in the range between 70° C. and 130° C., and producing said resin molded article.

* * * * *